(12) United States Patent
Oyasato

(10) Patent No.: US 8,832,422 B2
(45) Date of Patent: Sep. 9, 2014

(54) QUICK START-UP IMAGE FORMING APPARATUS, IMAGE FORMING METHOD, AND IMAGE FORMING SYSTEM

(75) Inventor: Tomoki Oyasato, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 518 days.

(21) Appl. No.: 13/167,022

(22) Filed: Jun. 23, 2011

(65) Prior Publication Data

US 2012/0005470 A1  Jan. 5, 2012

(30) Foreign Application Priority Data

Jun. 30, 2010 (JP) ................. 2010-150481

(51) Int. Cl.
*G06F 9/00* (2006.01)
*G06F 9/44* (2006.01)

(52) U.S. Cl.
CPC .................... *G06F 9/4416* (2013.01)
USPC .................................. 713/2; 713/1

(58) Field of Classification Search
None
See application file for complete search history.

(56) References Cited

U.S. PATENT DOCUMENTS

| 7,058,779 | B1 * | 6/2006 | McClain | 711/170 |
| 7,111,160 | B1 * | 9/2006 | Henniger et al. | 713/2 |
| 2006/0206701 | A1 * | 9/2006 | Hutton et al. | 713/1 |
| 2007/0050532 | A1 | 3/2007 | Ochiai | |

FOREIGN PATENT DOCUMENTS

| JP | H2-214369 A | 8/1990 |
| JP | 2002-182939 A | 6/2002 |
| JP | 2006-148838 A | 6/2006 |
| JP | 2007-28183 A | 2/2007 |
| JP | 2007-58743 A | 3/2007 |

OTHER PUBLICATIONS

English Machine Translation of JP 2002-182939A.
English Machine Translation of Abstract of JP H2-214369A.
English Machine Translation of JP 2006-148838A.
Communication from a foreign patent office for a counterpart foreign application dated Oct. 26, 2012.

* cited by examiner

*Primary Examiner* — Paul Yanchus, III
(74) *Attorney, Agent, or Firm* — Knobbe Martens Olson & Bear LLP

(57) ABSTRACT

An image forming apparatus includes a code storage device and a code execution device to perform booting based on a boot code from the code storage device. The code execution device includes a first communication unit and a first high-speed communication unit each communicable with the code storage device. The code storage device includes: a second communication unit and a second high-speed communication unit each communicable with the code execution device; a code storage unit to store a high-speed communication standby code required of the code execution device to use the first high-speed communication unit and a high-speed code transmitted to the code execution device via the second high-speed communication unit; and a code transmission unit to transmit the high-speed communication standby code to the code execution device via the second communication unit and to transmit the high-speed code to the code execution device via the second high-speed communication unit.

15 Claims, 6 Drawing Sheets

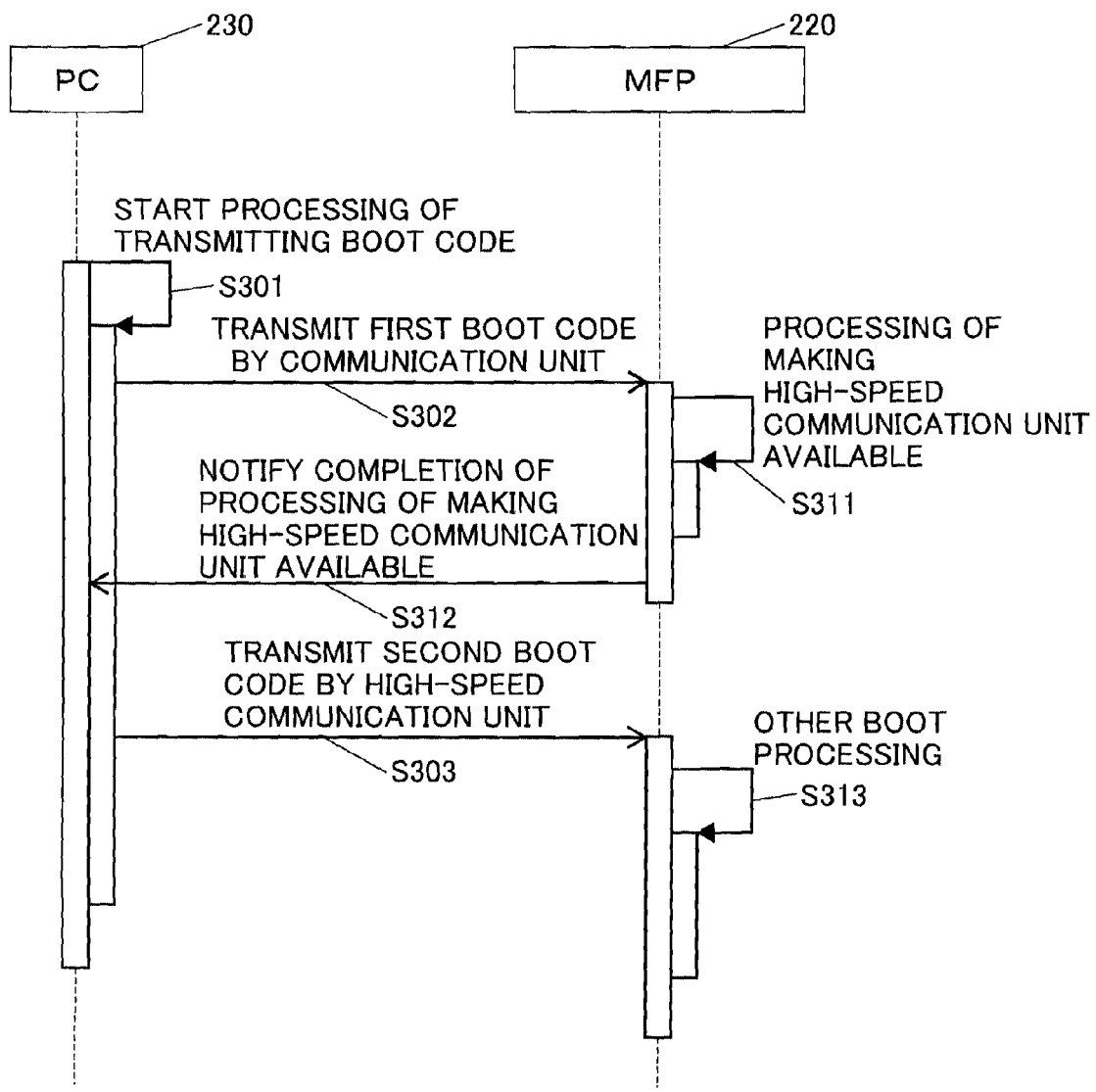

QUICK START-UP IMAGE FORMING APPARATUS, IMAGE FORMING METHOD, AND IMAGE FORMING SYSTEM

This application is based upon and claims the benefit of priority from corresponding Japanese Patent Application No. 2010-150481, filed in the Japan Patent Office on Jun. 30, 2010, the entire content of which is incorporated herein by reference.

BACKGROUND OF THE INVENTION

1. Field of the Invention

The present invention relates to an image forming apparatus including a device that executes booting based on a boot code acquired from another device, an image forming method, and an image forming system.

2. Related Art

It is known that a typical image forming apparatus includes a device that executes booting based on a boot code acquired from another device. In other words, it includes a control device that executes booting based on the boot code acquired from a storage device on a network.

When the image forming apparatus is configured to acquire the boot code from another device, the control device acquires the boot code from the storage device on the network via one type of bus. Accordingly, the speed at which the control device acquires the boot code from the storage device on the network is always constant. As a result, when the image forming apparatus is configured to acquire the boot code from another device, the completion of booting itself will be slow if the boot code is acquired via a bus with a slow communication speed.

Therefore, it is necessary to provide an image forming apparatus that finishes booting at a high speed to start up quickly.

SUMMARY OF THE INVENTION

The present disclosure relates to an image forming apparatus, image forming method and image forming system that finish booting at a high speed to start up quickly.

In an aspect of the present invention, an image forming apparatus is provided, which includes a code storage device configured to store boot codes and a code execution device configured to perform booting based on a boot code acquired from the code storage device. The code execution device includes a first communication unit configured to be communicable with the code storage device and a first high-speed communication unit configured to be communicable with the code storage device faster than the first communication unit. The code storage device includes: a second communication unit configured to be communicable with the code execution device; a second high-speed communication unit configured to be communicable with the code execution device faster than the second communication unit; a code storage unit configured to store a high-speed communication standby code that is a boot code required of the code execution device in order to use the first high-speed communication unit and a high-speed code that is a boot code transmitted to the code execution device via the second high-speed communication unit; and a code transmission unit configured to transmit the high-speed communication standby code to the code execution device via the second communication unit and to transmit the high-speed code to the code execution device via the second high-speed communication unit.

In another aspect of the present invention, an image forming method is provided, which includes: transmitting, via a code storage device configured to store boot codes, a first boot code to a code execution device via a communication unit at a time of starting an image forming apparatus; transmitting a second boot code to the code execution device via a high-speed communication unit; decomposing, via the code execution device configured to perform booting, the first boot code; and decomposing, via the code execution device, the second boot code.

In another aspect of the present invention, an image forming system is provided, which includes a terminal device configured to be communicable with a network and to store boot codes and an image forming apparatus configured to perform booting based on a boot code acquired from the terminal device. The image forming apparatus includes a first communication unit configured to be communicable with the terminal device and a first high-speed communication unit configured to be communicable with the terminal device faster than the first communication unit.

The terminal device includes: a second communication unit configured to be communicable with the image forming apparatus; a second high-speed communication unit configured to be communicable with the image forming apparatus faster than the second communication unit; a code storage unit configured to store a high-speed communication standby code that is a boot code required of the image forming apparatus in order to use the first high-speed communication unit, and a high-speed code that is a boot code transmitted to the first high-speed communication unit via the second high-speed communication unit; and a code transmission unit configured to transmit the high-speed communication standby code to the first communication unit via the second communication unit, and to transmit the high-speed code to the first high-speed communication unit via the second high-speed communication unit.

Additional features and advantages are described herein, and will be apparent from the following detailed descriptions and figures.

BRIEF DESCRIPTION OF THE DRAWINGS

FIG. 6 is a sequence diagram showing a processing sequence of booting of the image forming apparatus.

DETAILED DESCRIPTION OF THE INVENTION

First Embodiment

Figure 1:
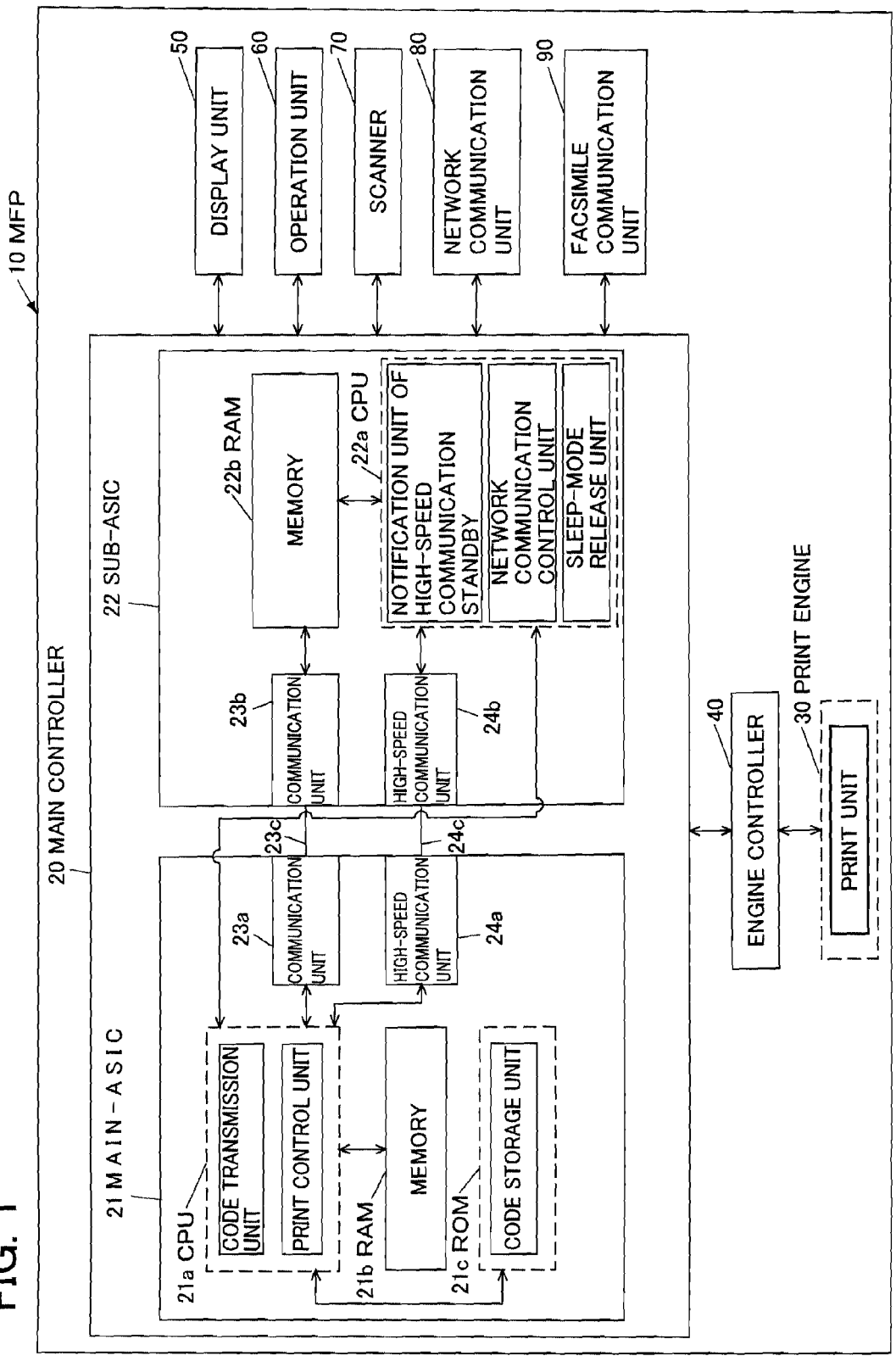
FIG. 1 is a block diagram of an image forming apparatus according to a first embodiment.

FIG. 1 is a block diagram of a Multi-function Peripheral (MFP) 10 according to a first embodiment.

As shown in FIG. 1, the MFP 10 includes a main controller 20, print engine 30, engine controller 40, display unit 50, operation unit 60, scanner 70, network communication unit 80 and facsimile communication unit 90. The main controller 20 controls the overall MFP 10. The print engine 30 executes printing as a print unit on a recording medium such as paper. The engine controller 40 controls the print engine 30. The display unit 50 displays various information. The operation unit 60 allows a user to input various operations. The scanner 70 is a reading device which generates image data by reading an original document. The network communication unit 80 performs communication with an external device (not illustrated) such as a Personal Computer (PC) via a network such as a Local Area Network (LAN). The facsimile communication unit 90 performs FAX communication with an external facsimile device via a communication line such as a public telephone line.

The main controller 20 includes a Main Application Specific Integrated Circuit (main-ASIC) 21 as a code storage device that stores boot codes, and a Sub Application Specific Integrated Circuit (sub-ASIC) 22 as a code execution device that executes booting based on a boot code acquired from the main-ASIC 21.

The main-ASIC 21 includes a Central Processing Unit (CPU) 21, Random Access Memory (RAM) 21b as memory used as a work area of the CPU 21a, Read Only Memory (ROM) 21c in which a program and various data is stored in advance, a communication unit 23a communicable with the sub-ASIC 22, and a high-speed communication unit 24a communicable with the sub-ASIC 22 faster than the communication unit 23a. The CPU 21a is a processing unit that causes the main-ASIC 21 to operate by executing a program stored in the ROM 21c. The RAM 21b is configured to temporarily store a program and various data while the program is executed by the CPU 21a.

The main-ASIC 21 implements functions among those of the main controller 20 other than the functions performed by the sub-ASIC 22. For example, the CPU 21a of the main-ASIC 21 is configured to control the print engine 30 via the engine controller 40, and has a function of a print control unit.

The sub-ASIC 22 includes a CPU 22a, RAM 22b as memory used as a work area of the CPU 22a, a communication unit 23b communicable with the main-ASIC 21, and a high-speed communication unit 24b communicable with the main-ASIC 21 faster than the communication unit 23b. The CPU 22a is a processing unit that causes the sub ASIC 22 to operate by executing the program stored in the ROM 21c of the main ASIC 21. The RAM 22b is configured to temporarily store a program and various data when the program is executed by the CPU 22a.

Among the functions of the main controller 20, the sub-ASIC 22 implements communication functions via the network communication unit 80. In this way, the CPU 22a of the sub-ASIC 22 is configured to control the network communication unit 80, and has a function of a network communication control unit.

A transmission path between the communication unit 23a and the communication unit 23b is a Serial Peripheral Interface (SPI) 23c, and a transmission path between the high-speed communication unit 24a and the high-speed communication unit 24b is a Peripheral Component Interconnect Express (PCIe) 24c, for example. The SPI 23c is a low-speed bus compared to the PCIe 24c, and the PCIe 24c is a high-speed bus compared to the SPI 23c. It should be noted that, after the completion of pre-processing of the RAM 22b performed by the CPU 22a of the sub-ASIC 22, the PCIe 24c becomes available.

The print engine 30 is a print device that prints various data such as image data generated by the scanner 70, print data received from an external device via the network communication unit 80, and FAX data received from an external facsimile device via the facsimile communication unit 90, for example.

The engine controller 40 includes a CPU, RAM used as work area of the CPU, and ROM in which programs and various data are stored in advance. The CPU is a processing unit that causes the engine controller 40 to operate by executing a program stored in the ROM. The RAM is configured to temporarily store a program and various data when the program is executed by the CPU.

The display unit 50 is a display device such as a Liquid Crystal Display (LCD), for example.

The operation unit 60 is configured from an input device of buttons or the like forming a touch panel with the display unit 50.

The network communication unit 80 is configured to send image data generated by the scanner 70 to an external device and to receive print data for printing to be performed by the print engine 30 from an external device, for example.

The facsimile communication unit 90 is configured to perform FAX transmission of image data generated by the scanner 70 to an external facsimile device and to receive FAX data for printing to be performed by the print engine 30 from an external facsimile device, for example.

Figure 2:
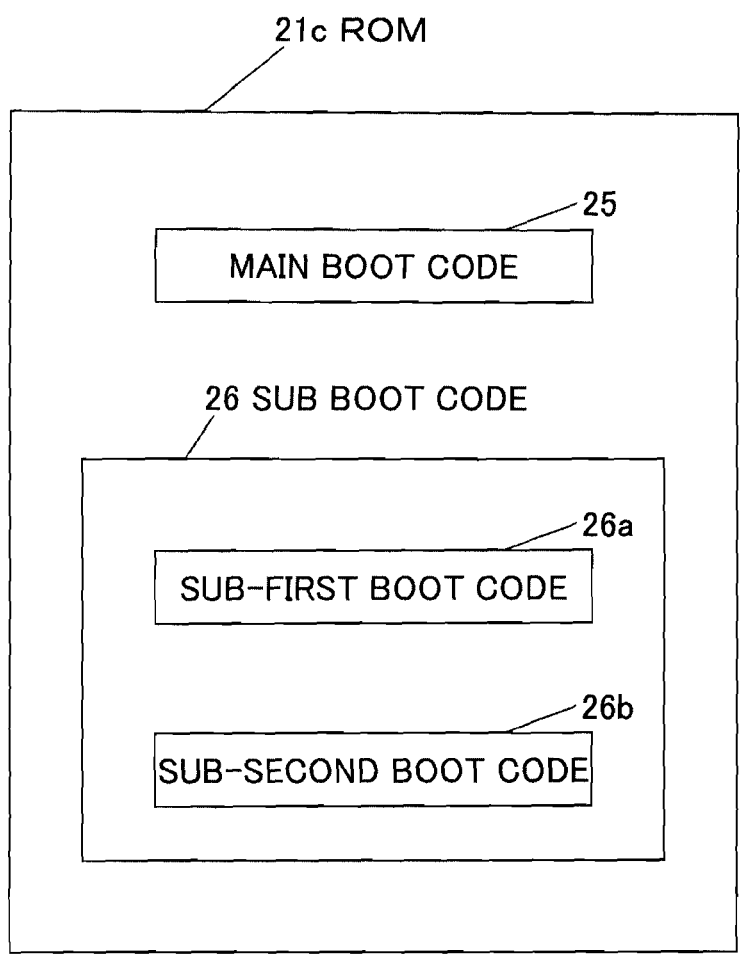
FIG. 2 is a diagram showing a boot code stored in Read Only Memory (ROM)

FIG. 2 is a diagram showing a boot code stored in the ROM 21c.

As shown in FIG. 2, the ROM 21c stores a main boot code 25 prepared for the main-ASIC 21. In addition, the ROM 21c stores a sub boot code 26 prepared for the sub-ASIC 22, and has a function of a code storage unit. The sub boot code 26 includes a sub-first boot code 26a that is treated before pre-processing of the RAM 22b, and a sub-second boot code 26b that is treated after pre-processing of the RAM 22b. Herein as described above, the PCIe 24c becomes available after the completion of pre-processing of the RAM 22b performed by the CPU 22a. In other words, the sub-first boot code 26a is a boot code for the sub-ASIC 22 to make the PCIe 24c available, and configures a high-speed communication standby code. In addition, the sub-second boot code 26b is a boot code that is sent to the sub-ASIC 22 via the PCIe 24 as will be described later, and configures a high-speed code.

Next, operations of the MFP 10 will be explained.

When the MFP 10 is started up, the CPU 21a of the main-ASIC 21 reads the main boot code 25 from the ROM 21c, and decomposes the main boot code 25 thus read on the RAM 21b, thereby completing booting.

Figure 3:
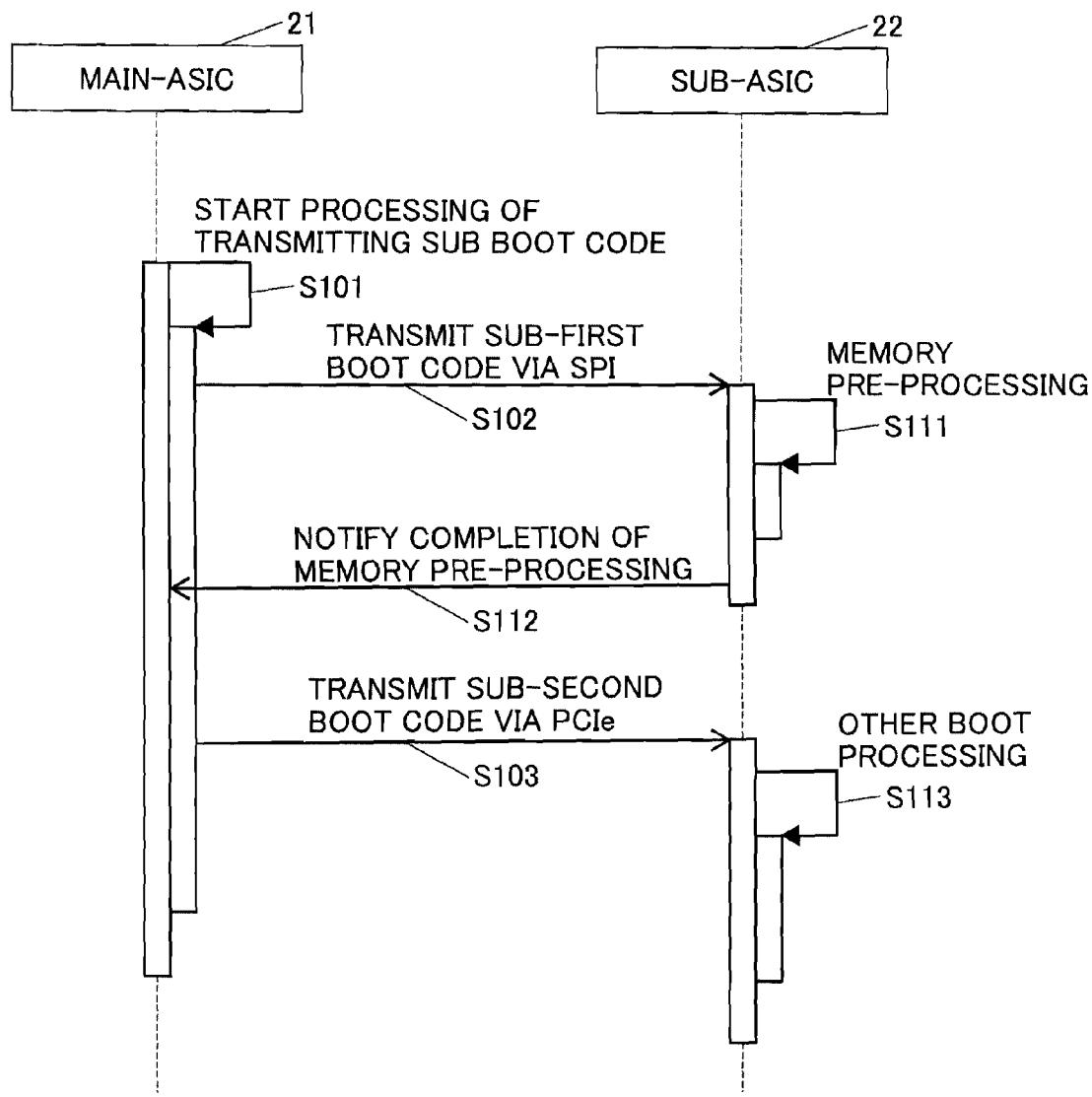
FIG. 3 is a sequence diagram showing a processing sequence of booting in a Sub Application Specific Integrated Circuit (sub-ASIC)

FIG. 3 is a sequence diagram showing a boot processing of the sub-ASIC 22.

As shown in FIG. 3, the CPU 21a of the main-ASIC 21 reads the sub boot code 26 from the ROM 21c, and initiates processing to transfer the sub boot code 26 thus read to the sub-ASIC 22 (Step S101). It should be noted that, when the CPU 21a initiates the processing to transfer the sub boot code 26 to the sub-ASIC 22, the CPU 21a suspends performing other processing until it finishes transferring the entirety of the sub boot code 26 to the sub-ASIC 22.

Next, the CPU 21a transfers the sub-first boot code 26a of the sub boot code 26 read from the ROM 21c to the sub-ASIC 22 via the SPI 23, and immediately decomposes the sub-first boot code 26a on the RAM 22b of the sub-ASIC 22 (Step S102). In this manner, the CPU 21a is configured to transmit the sub boot code 26 to the sub-ASIC 22, and configures a code transmission unit. It should be noted that, when the CPU 21a completes decomposing the sub-first boot code 26a on the RAM 22b of the sub-ASIC 22, it transmits a signal to indicate the CPU 22a of the sub-ASIC 22 to initiate booting (hereinafter referred to as "boot start signal") to the CPU 22a.

When the CPU 22a of the sub-ASIC 22 receives the boot start signal from the CPU 21a of the main-ASIC 21, the CPU 22a executes booting based on the sub-first boot code 26a decomposed on the RAM 22b. In other words, the CPU 22a executes pre-processing of the RAM 22b based on the sub-first boot code 26a (Step S111).

When the CPU 22a completes pre-processing of the RAM 22b, the CPU 22a notifies completion of the pre-processing of the RAM 22b to the CPU 21a of the main-ASIC 21 (Step S112). Herein, the pre-processing of the RAM 22b causes the sub-ASIC 22 to be on standby to communicate via the PCIe 24c. Specifically, the notification performed in Step S112 indicates that the sub-ASIC 22 has made the PCIe 24c available. In this manner, the CPU 22a is configured to notify the main-ASIC 21 of the sub-ASIC 22 being on standby to communicate via the PCIe 24c, and configures a notification unit of high-speed communication standby.

When the CPU 21a of the main-ASIC 21 receives the notification of completion of pre-processing of the RAM 22b from the CPU 22a of the sub-ASIC 22, the CPU 21a transfers the sub-second boot code 26b of the sub boot code 26 read from the ROM 21c to the sub-ASIC 22 via the PCIe 24c (Step S103).

When the CPU 22a of the sub-ASIC 22 receives the sub-second boot code 26b from the main-ASIC 21 via the PCIe 24c, the CPU 22a decomposes the sub-second boot code 26b thus received and executes booting. In other words, the CPU 22a executes the remaining boot processing based on the sub-second boot code 26b (Step S113).

When a predetermined condition is met, such as the MFP 10 that has been started up as described above not being used by a user for a certain time period, the CPU 21a of the main-ASIC 21 implements energy savings by causing the main-ASIC 21 to be switched to a sleep mode. When print data is sent from a device outside the MFP 10 while the main-ASIC 21 is in the sleep mode, the CPU 22a of the sub-ASIC 22 receives the print data via the network communication unit 80 and transmits a signal to release the sleep mode of the main-ASIC 21 to the CPU 21a of the main-ASIC 21. The CPU 21a of the main-ASIC 21 having received this signal reads the main boot code 25 from the ROM 21c, decomposes the main boot code 25 thus read on the RAM 21b, and completes booting. In this manner, the CPU 22a of the sub-ASIC 22 is configured to release the sleep mode of the main-ASIC 21, and configures a sleep-mode release unit.

It is possible for the MFP 10 to complete booting quickly. This is accomplished in the manner described above: The sub-first boot code 26a is sent from the main-ASIC 21 to the sub-ASIC 22 via the SPI 23c before the sub-ASIC 22 makes the PCIe 24c available (Step S102). On the other hand, the sub-second boot code 26b is sent from the main-ASIC 21 to the sub-ASIC 22 via the PCIe 24c after the sub-ASIC 22 has made the PCIe 24c available (Step S103).

In addition, after a notification from the CPU 22a of the sub-ASIC 22 has been received by the CPU 21a of the main-ASIC 21 (Step S112), the MFP 10 transmits the sub-second boot code 26b to the sub-ASIC 22 via the PCIe 24c (Step S103). Accordingly, it is possible to transmit the boot code from the main-ASIC 21 to the sub-ASIC 22 via the PCIe 24c immediately after the sub-ASIC 22 has made the PCIe 24c available. Consequently, the MFP 10 completes booting more quickly.

The MFP 10 is separated into the main-ASIC 21 that controls printing and the sub-ASIC 22 that controls communication via a network in order to implement energy savings. Since the MFP 10 completes booting quickly, it is possible for the sub-ASIC 22 for which booting is completed quickly to control communication via the network at an early stage. Therefore, the MFP 10 can promptly print a print job via the network.

It should be noted that, although the CPU 21a of the main-ASIC 21 is configured to transmit the sub-second boot code 26 after having received the notification from the CPU 22a of the sub-ASIC 22 (Step S112) to the sub-ASIC 22 via the PCIe 24c (Step S103), it may alternatively be configured to transmit the sub-second boot code 26b to the sub-ASIC 22 via the PCIe 24c (Step S103), when a predetermined time has elapsed since the sub-first boot code 26a was transmitted to the sub-ASIC 22 via the SPI 23c (Step S102). Under such a configuration, the notification from the sub-ASIC 22 to the main-ASIC 21 (Step S112) may be omitted.

In the first embodiment, among the functions of the main controller 20, the sub-ASIC 22 implements the communication functions via the network communication unit 80, and the main-ASIC 21 implements the functions other than those of the sub-ASIC 22. However, the allotments of functions of the main-ASIC 21 and the sub-ASIC 22 are not to be limited to the aforementioned allotments.

Although the transmission path between the communication unit 23a and the communication unit 23b is the SPI 23c in the first embodiment, it may alternatively be another type of bus. Similarly, although the transmission path between the high-speed communication unit 24a and the communication unit 24b is the PCIe 24c in the first embodiment, it may alternatively be another type of bus.

When the transmission path between the high-speed communication unit 24a and the high-speed communication unit 24b is a bus other than the PCIe 24c, the processing for the sub-ASIC 22 to make the high-speed communication unit 24b available, such as the pre-processing of the RAM 22b and the like, varies depending on the type of high-speed communication unit.

In the first embodiment, although transmission from the main-ASIC 21 to the sub-ASIC 22 is a two-stage technique of transmission by the SPI 23c and the PCIe 24c, it may alternatively be transmission in three or more stages in which the transmission rate gradually increases to higher speeds.

It should be noted that, although the image forming apparatus is an MFP in the first embodiment, it may alternatively be an image forming apparatus other than an MFP such as a copier machine or a printer.

Second Embodiment

Figure 4:
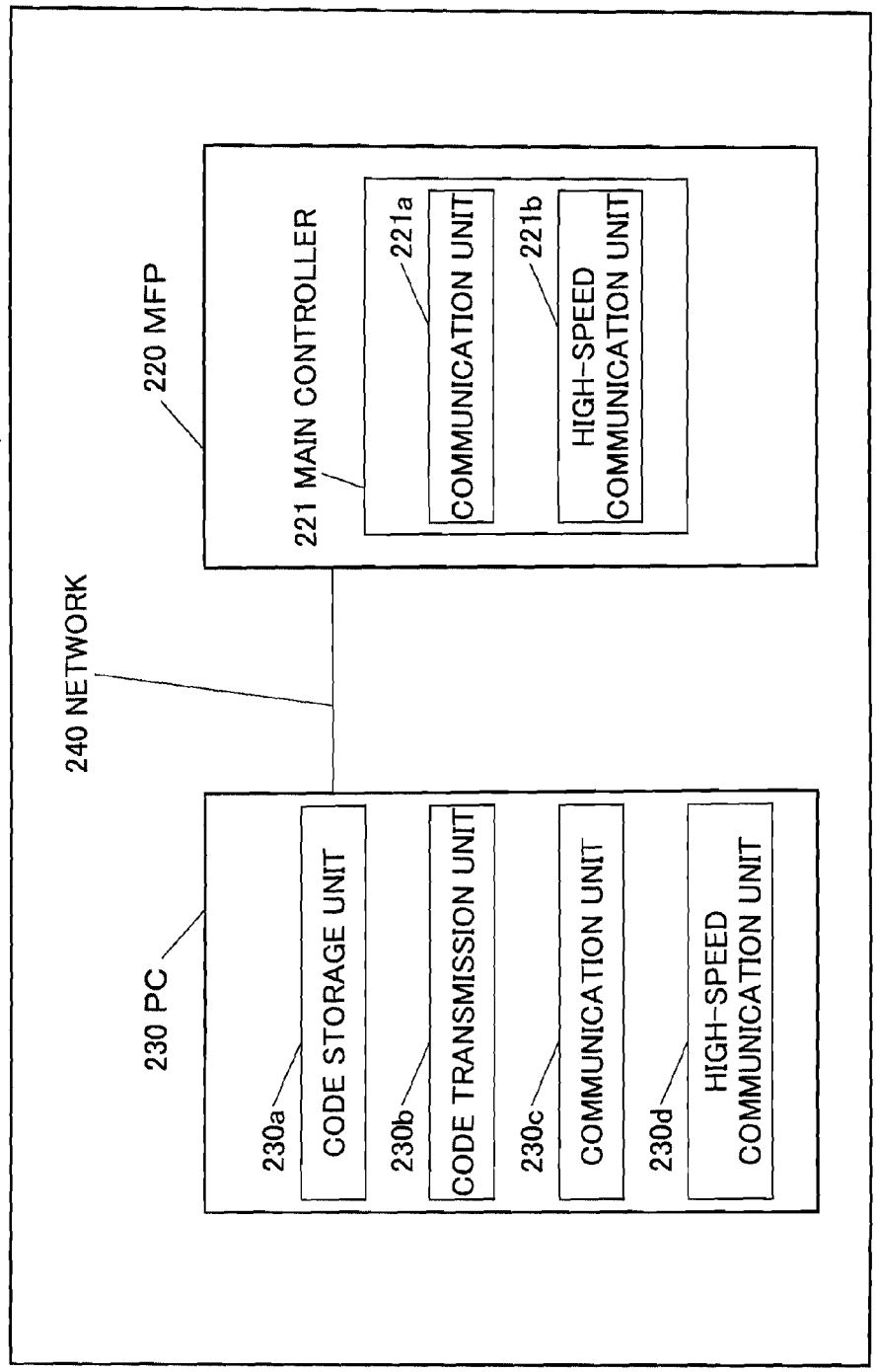
FIG. 4 is a block diagram of an image forming system according to a second embodiment.

FIG. 4 is a block diagram of an image forming system 210 according to a second embodiment.

As shown in FIG. 4, the image forming system 210 includes an MFP 220 as an image forming apparatus, PC 230 as a terminal device that stores boot codes of the MFP 220, and network 240 that communicably connects the MFP 220 and the PC 230.

In addition to a main controller 221 that controls the entirety of the MFP 220, the MFP 220 includes a print engine, engine controller, display unit, operation unit, scanner, network communication unit and facsimile communication unit, similarly to the MFP 10 according to the first embodiment (refer to FIG. 1).

The main controller 221 includes a CPU, RAM that is used as a work area of the CPU, and ROM in which programs and various data is stored in advance. The CPU is a processing unit that causes the main controller 221 to operate by executing a program stored in the ROM. The RAM is configured to temporarily store a program and various data when the program is being executed by the CPU.

The CPU executes a program, so that the main controller 221 functions as a communication unit 221a and a high-speed communication unit 221b that perform communication with the PC 230. A protocol employed by the high-speed communication unit 221b has a communication speed higher than a protocol employed by the communication unit 221a. The main controller 221 configures a code execution device that executes booting based on a boot code acquired from the PC 230.

The PC 230 includes a CPU, RAM that is used as a work area of the CPU, ROM in which programs and various data are stored in advance, and a Hard Disk Drive (HDD). The CPU is a processing unit that causes the PC 230 to operate by executing a program stored in the ROM and HDD. The RAM is configured to temporarily store a program and various data when the program is executed by the CPU.

The PC 230 employs the HDD to configure a code storage unit 230a that stores boot codes of the MFP 220.

In addition, the PC 230, in which the CPU executes a program, configures: a code transmission unit 230b that transmits boot codes of the MFP 220 to the main controller 221 of the MFP 220; a communication unit 230c communicable with the communication unit 221a of the main controller 221, and a high-speed communication unit 230d communicable with the high-speed communication unit 221b of the main controller 221.

It should be noted that the communication unit 221a of the main controller 221 of the MFP 220 and the communication unit 230c of the PC 230 are configured to cause the main controller 221 and the PC 230 to be communicably connected with each other via the network 240. In addition, the high-speed communication unit 221b of the main controller 221 of the MFP 220 and the high-speed communication unit 230d of the PC 230 are configured to cause the main controller 221 and the PC 230 to be communicably connected with each other via the network 240, using a protocol having a communication speed higher than the communication unit 221a and the communication unit 230c. In this manner they configure a high-speed communication unit.

Figure 5:
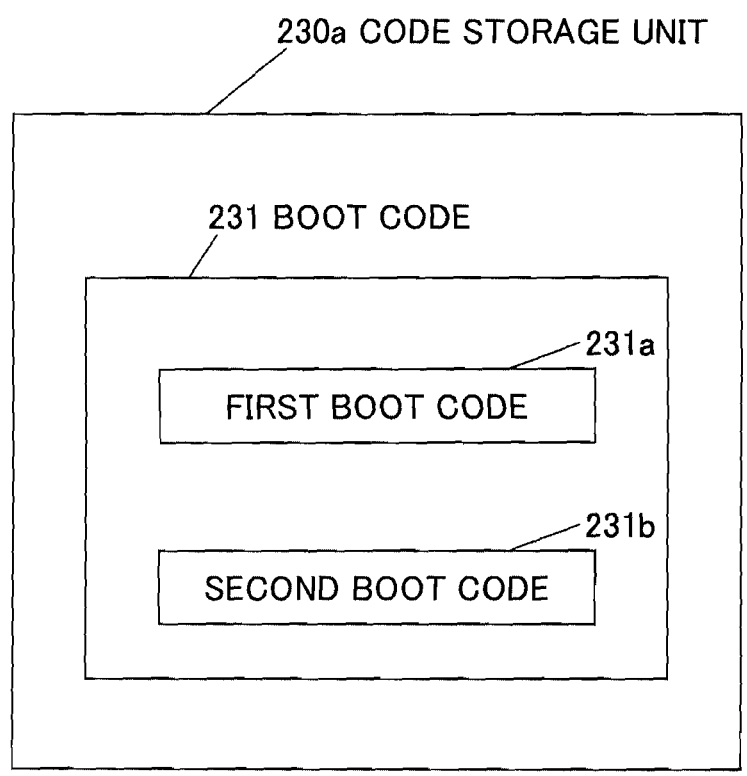
FIG. 5 is a diagram showing a boot code stored in a code storage unit.

FIG. 5 is a diagram showing a boot code 231 of the MFP 220 stored in a code storage unit 230a.

As shown in FIG. 5, the boot code 231 of the MFP 220 stored in the code storage unit 230a includes a first boot code 231a and a second boot code 231b. The first boot code 231a is a high-speed communication standby code for the main controller 221 of the MFP 220 to make the high-speed communication unit 221b available. The second boot code 231b is a high-speed code that is sent to the main controller 221 via the high-speed communication unit 221b.

Next, operations of the MFP 220 will be explained.

When the MFP 220 is started up, the CPU of the main controller 221 requests of the PC 230 the boot code 231 of the MFP 220 via the network 240.

FIG. 6 is a sequence diagram showing a boot processing sequence of the MFP 220.

When the MFP 220 requests the boot code 231, the code transmission unit 230b of the PC 230 reads the boot code 231 from the code storage unit 230a, and initiates processing to transmit the boot code 231 thus read to the MFP 220, as shown in FIG. 6 (Step S301).

Next, the code transmission unit 230b transmits the first boot code 231a of the boot code 231 read from the code storage unit 230a to the MFP 220 via the communication unit 230c and the communication unit 221a (Step S302).

When the main controller 221 of the MFP 220 receives the first boot code 231a from the PC 230 via the communication unit 230c and the communication unit 221a, the main controller 221 decomposes the first boot code 231a thus received on the RAM, and executes booting. In other words, the main controller 221 executes processing to make the high-speed communication unit 221b available based on the first boot code 231a (Step S311).

When the main controller 221 completes the processing to make the high-speed communication unit 221b available, the main controller 221 notifies the PC 230 that the high-speed communication unit 221b has become available via the communication unit 221a and the communication unit 230c (Step S312).

When the CPU of the PC 230 receives a notification indicating that the main controller 221 has made the high-speed communication unit 221b available from the MFP 220 via the communication unit 221a and the communication unit 230c, the CPU transmits the second boot code 231b of the boot code 231 read from the code storage unit 230a to the MFP 220 via the high-speed communication unit 230d and the high-speed communication unit 221b (Step S303).

When the main controller 221 of the MFP 220 receives the second boot code 231b from the PC 230 via the high-speed communication unit 230d and the high-speed communication unit 221b, the main controller 221 decomposes the second boot code 231b thus received on the RAM, and executes booting. In other words, the main controller 221 executes the remaining boot processing based on the second boot code 231b (Step S313).

As has been explained in the foregoing, in the image forming system 210, the MFP 220 transmits the first boot code 231a, which is treated before the MFP 220 makes the high-speed communication unit 221b available, from the PC 230 to the MFP 220 via the communication unit 230c and the communication unit 221a (Step S302). Furthermore, the MFP 220 transmits the second boot code 231b, which is treated after the MFP 220 has made the high-speed communication unit 221b available, from the PC 230 to the MFP 220 via the high-speed communication unit 230d and the high-speed communication unit 221b (Step S303). In this manner, the image forming system 210 completes booting of the MFP 220 quickly.

After the CPU of the PC 230 has received a notification from the main controller 221 of the MFP 220 (Step S312), the image forming system 210 transmits the second boot code 231b to the MFP 220 via the high-speed communication unit 230d and the high-speed communication unit 221b (Step S303). In this manner, it is possible for the image forming system 210 to transmit a boot code from the PC 230 to the MFP 220 via the high-speed communication unit 230d and the high-speed communication unit 221b, immediately after the MFP 220 has made the high-speed communication unit 230d and the high-speed communication unit 221b available. Therefore, it is possible for the image forming system 210 to complete booting at a higher speed.

It should be noted that, although the CPU of the PC 230 is configured to transmit the second boot code 231b to the MFP 220 via the high-speed communication unit 230d and the high-speed communication unit 221b (Step S303) after having received a notification from the main controller 221 of the MFP 220 (Step S312), the CPU of the PC 230 may be configured to transmit the second boot code 231b to the MFP 220 via the high-speed communication unit 230d and the high-speed communication unit 221b (Step S303) when a predetermined time has elapsed after sending the first boot code 231a to the MFP 220 via the communication unit 230c and the communication unit 221a (Step S302). When the CPU of the PC 230 transmits the second boot code 231b to the MFP 220 via the high-speed communication unit 230d and the high-speed communication unit 221b when the predetermined time has elapsed, the notification from the MFP 220 to the PC 230 (Step S312) may be omitted.

Although the transmission of the boot code from the PC 230 to the MFP 220 is a two-stage technique of transmission via the communication unit 230c and the communication unit 221a and transmission via the high-speed communication unit 230d and the high-speed communication unit 221b in the second embodiment, it may alternatively be three or more stages of transmission in which the transmission rate gradually increases to higher speeds.

It should be noted that, although the image forming apparatus of the present invention is exemplified as an MFP in the second embodiment, it may be an image forming apparatus other than an MFP.

What is claimed is:

1. An image forming apparatus, comprising:
   a code storage device configured to store boot codes; and
   a code execution device configured to perform booting based on a boot code acquired from the code storage device;
   wherein the code execution device comprises:
   a first communication unit configured to be communicable with the code storage device;
   one first high-speed communication unit configured to be communicable with the code storage device faster than the first communication unit; and
   the other first high-speed communication unit configured to be communicable with the code storage device faster than the one first high-speed communication unit;
   wherein the code storage device comprises:
   a second communication unit configured to be communicable with the code execution device;
   one second high-speed communication unit configured to be communicable with the code execution device faster than the second communication unit;
   the other second high-speed communication unit configured to be communicable with the code execution device faster than the one second high-speed communication unit;
   a code storage unit configured to store high-speed communication standby codes that are boot codes required of the code execution device in order to use the one and the other first high-speed communication unit, and high-speed codes that are boot code codes transmitted to the code execution device via the one and the other second high-speed communication unit; and
   a code transmission unit configured to transmit the high-speed communication standby codes to the code execution device via the second communication unit and the one second high-speed communication unit and to transmit the high-speed codes to the code execution device via the one and the other second high-speed communication unit,
   wherein a high-speed code transmitted to the code execution device via the one second high-speed communication unit includes a high-speed communication standby code to enable the other first high-speed communication unit.

2. The image forming apparatus according to claim 1,
   wherein a transmission path between the first communication unit and the second communication unit comprises Serial Peripheral Interface (SPI), and
   wherein a transmission path between the one first high-speed communication unit and the one second high-speed communication unit comprises Peripheral Component Interconnect Express (PCIe).

3. The image forming apparatus according to claim 1,
   wherein the code transmission unit is configured to transmit the high-speed communication standby codes to the code execution device via the second communication unit and the one second high-speed communication unit at a time of starting the image forming apparatus.

4. The image forming apparatus according to claim 1,
   wherein the code transmission unit is configured to transmit the high-speed codes to the code execution device via the one and the other second high-speed communication unit after the code transmission unit transmits the high-speed communication standby codes.

5. The image forming apparatus according to claim 4,
   wherein the code execution device further comprises a notification unit of high-speed communication standby configured to notify the code storage device of availability of the one and the other first high-speed communication unit, and
   wherein the code transmission unit is configured to transmit the high-speed codes to the code execution device via the one and the other second high-speed communication unit after the code transmission unit receives notification of the availability of the one and the other first high-speed communication unit from the notification unit of high-speed communication standby.

6. The image forming apparatus according to claim 1, further comprising:
   a print unit configured to print onto a recording medium; and
   a network communication unit configured to be communicable with an external device via a network,
   wherein the code storage device further comprises a print control unit configured to control the print unit,
   wherein the code execution device further comprises:
   a network communication control unit configured to control the network communication unit; and
   a sleep-mode release unit configured to release a sleep mode of the code storage device.

7. The image forming apparatus according to claim 6,
   wherein the sleep-mode release unit is configured to release the sleep mode of the code storage device at a timing when a print data is transmitted from the external device to the network communication unit.

8. An image forming method, comprising:
   transmitting, via a code storage device configured to store boot codes, a first boot code to a code execution device via a communication unit at a time of starting an image forming apparatus;
   transmitting a second boot code to the code execution device via one high-speed communication unit which is communicable faster than the communication unit;
   transmitting a third boot code to the code execution device via the other high-speed communication unit which is communicable faster than the one high-speed communication unit;
   decomposing, via the code execution device configured to perform booting, the first boot code;
   decomposing, via the code execution device, the second boot code; and
   decomposing, via the code execution device, the third boot code.

9. The image forming method according to claim 8, further comprising:
   transmitting, via the code storage device, the second boot code after transmitting the first boot code, and
   transmitting, via the code storage device, the third boot code after transmitting the second boot code.

10. The image forming method according to claim 9, further comprising:
   notifying, via the code execution device, the code storage device of availability of the one high-speed communication unit after decomposing the first boot code;
   transmitting, via the code storage device, the second boot code to the code execution device after receiving notification of the availability of the one high-speed communication unit;
   notifying, via the code execution device, the code storage device of availability of the other high-speed communication unit after decomposing the second boot code; and
   transmitting, via the code storage device, the third boot code to the code execution device after receiving notification of the availability of the other high-speed communication unit.

11. The image forming method according to claim 8, further comprising:
   causing, via the code execution device, the code storage device to be switched to a sleep mode;
   notifying the code storage device of release of the sleep mode when the code execution device receives a print data from an external device; and
   releasing, via the code storage device, the sleep mode of the code storage device.

12. An image forming system, comprising:
   a terminal device configured to be communicable with a network and to store boot codes; and
   an image forming apparatus configured to perform booting based on a boot code acquired from the terminal device,
   wherein the image forming apparatus comprises:
   a first communication unit configured to be communicable with the terminal device;
   one first high-speed communication unit configured to be communicable with the terminal device faster than the first communication unit; and
   the other first high-speed communication unit configured to be communicable with the terminal device faster than the one first high-speed communication unit,
   wherein the terminal device comprises:
   a second communication unit configured to be communicable with the image forming apparatus;
   one second high-speed communication unit configured to be communicable with the image forming apparatus faster than the second communication unit;
   the other second high-speed communication unit configured to be communicable with the image forming apparatus faster than the one second high-speed communication unit;
   a code storage unit configured to store high-speed communication standby codes that are boot codes required of the image forming apparatus in order to use the one and the other first high-speed communication unit, and high-speed codes that are boot codes transmitted to the one and the other first high-speed communication unit via the one and the other second high-speed communication unit; and
   a code transmission unit configured to transmit the high-speed communication standby codes to the first communication unit via the second communication unit and to the one first high-speed communication unit via the one second high-speed communication unit, and to transmit the high-speed codes to the one and the other first high-speed communication unit via the one and the other second high-speed communication unit,
   wherein a high-speed code transmitted to the one first high-speed communication unit via the one second high-speed communication unit includes a high-speed communication standby code to enable the other first high-speed communication unit.

13. The image forming system according to claim 12,
   wherein the code transmission unit is configured to transmit the high-speed communication standby codes to the image forming apparatus via the second communication unit and the one second high-speed communication unit at a time of starting the image forming apparatus.

14. The image forming system according to claim 12,
   wherein the code transmission unit is configured to transmit the high-speed codes to the image forming apparatus via the one and the other second high-speed communication unit after the code transmission unit transmits the high-speed communication standby codes.

15. The image forming system according to claim 14,
   wherein the image forming apparatus is configured to notify the terminal device of availability of the one and the other first high-speed communication unit, and
   wherein the code transmission unit is configured to transmit the high-speed codes to the image forming apparatus via the one and the other first high-speed communication unit after the code transmission unit receives notification of the availability of the one and the other first high-speed communication unit from the image forming apparatus.

* * * * *